United States Patent [19]

Burton et al.

[11] 4,131,917

[45] Dec. 26, 1978

[54] FREQUENCY LIMITER

[75] Inventors: Jack D. Burton, Orlando, Fla.; John M. Vandling, Pleasantville, N.Y.

[73] Assignee: Exxon Research & Engineering Co., Florham Park, N.J.

[21] Appl. No.: 844,296

[22] Filed: Oct. 21, 1977

[51] Int. Cl.² ............................................... H04N 1/40
[52] U.S. Cl. .................................. 358/281; 358/284; 325/30; 178/66 R
[58] Field of Search ............... 358/280, 281, 284, 904; 325/30; 178/66

[56] References Cited

U.S. PATENT DOCUMENTS

| | | | |
|---|---|---|---|
| 3,392,232 | 7/1968 | Cohen | 358/281 |
| 3,706,842 | 12/1972 | Robertson | 358/281 |
| 3,735,034 | 5/1973 | Richeson, Jr. | 358/281 |
| 3,813,483 | 5/1974 | Kurosawa et al. | 358/281 |
| 3,845,242 | 10/1974 | Richeson, Jr. et al. | 358/284 |

Primary Examiner—Robert L. Richardson
Assistant Examiner—Edward L. Coles
Attorney, Agent, or Firm—N. L. Norris

[57] ABSTRACT

Frequency modulated pulses representing dark/light variations on a document are applied to a frequency limiting circuit prior to synthesizing a low distortion sinewave voice band signal from the pulses. The frequency limiting circuit detects the frequency of the pulses and divides the frequency when the frequency exceeds a predetermined level. Detection of frequencies in excess of the predetermined level is achieved by a counter which counts clock pulses applied to the counter during each cycle of the frequency modulated pulses to determine the time between pulses and thus the frequency of the pulses. A gate only passes the pulses after a predetermined count has been reached.

10 Claims, 2 Drawing Figures

FREQUENCY LIMITER

BACKGROUND OF THE INVENTION

This invention relates to facsimile equipment and, more particularly, to the generation of frequency modulated facsimile signals representing dark/light variations (or ligh/dark variations) on a document. Copending application Ser. No. 844,298 filed 10/21/77 discloses a facsimile transmitter which synthesizes a frequency modulated sinewave representing dark/light variations on a document from a high frequency pulse train which is frequency modulated to represent the same dark/light variation. This type of transmitter is particularly advantageous since it allows the frequency of the sinewave to change rapidly without delays and phase distortion substantially instantaneously with a change in the frequency of the pulse train. More particularly, the sinewave is capable of changing frequency in a mere fraction of its cycle in response to a change in pulse frequency. This may be achieved with minimum filtering since high frequency harmonics which must be attenuated are substantially higher in frequency than the output signal, thus the phase delays and distortions which would otherwise be introduced with filtering are avoided.

The synthesizing of a sinewave for use in connection with facsimile equipment is particularly desirable at this time in view of the liberalization of the rules by the FCC which permits direct connection of customer-provided equipment including facsimile transceivers to the telephone network without benefit of acoustic coupling which can itself introduce distortion. However, the liberalized rules for direct connection to the telephone network still require certain limitations in the frequencies which may be introduced into the telephone network. Accordingly, it is generally desired to maintain the frequency of the transmission signal below a maximum upper frequency, e.g., 2525 Hz. for standard voice grade telephone network, since there is no low pass filter associated with the transmitted signal. However, there are no means provided in such a digital-to-analog synthesizing network to assure that the frequency will not rise above 2525 Hz.

SUMMARY OF THE INVENTION

It is an object of this invention to provide a frequency limiting circuit which avoids phase distortion and delays normally introduced by conventional filtering techniques.

It is a further object of this invention to provide such a frequency limiting circuit for use in connection with a synthesizing network of the type which may be utilized with voice grade telephone lines to transmit FM modulated signals.

In accordance with these and other objects of the invention, a frequency limiting circuit embodying the invention comprises detecting means for detecting when the frequency of a signal exceeds a predetermined level and frequency dividing means coupled to the detecting means for dividing the frequency of the signal in response to the detection of the predetermined level.

The detecting means may comprise counter means and clock means coupled to the counter means for applying clock pulses to the counter means during each cycle of the signal. The frequency dividing means includes gate means coupled to the counter means for coupling the signal through the gate means after a predetermined count has been reached since the last signal was coupled through the gate means. The frequency limiting circuit may further comprise means for resetting the counter at the beginning of each cycle of input signal applied to the frequency limiter.

In a particularly preferred embodiment of the invention, the frequency limiting circuit is utilized in connection with a facsimile transmitting apparatus comprising sensor means for sensing dark and light regions on a document and transmitting means for generating frequency modulated signals representing the dark and light regions on the document. The signal which is supplied to the frequency limiting circuit has a substantially higher frequency than the modulated transmission signal and the frequency of the higher frequency signal varies in response to the dark and light regions. A converter means generates the transmission signal from the higher frequency signal such that rapid dark/light variations between the regions produces a change in frequency of the high frequency signal which in turn produces the same rapid change in frequency in the transmission signal which may take place in a fraction of a transmission signal cycle. The frequency limiting circuit couples the higher frequency signal from the signal generating means to the converter means and assures that the frequency of the higher frequency signal as applied to the converter means does not exceed a predetermined level, e.g., 2525 Hz.

DETAILED DESCRIPTION OF A PREFERRED EMBODIMENT

Figure 1:
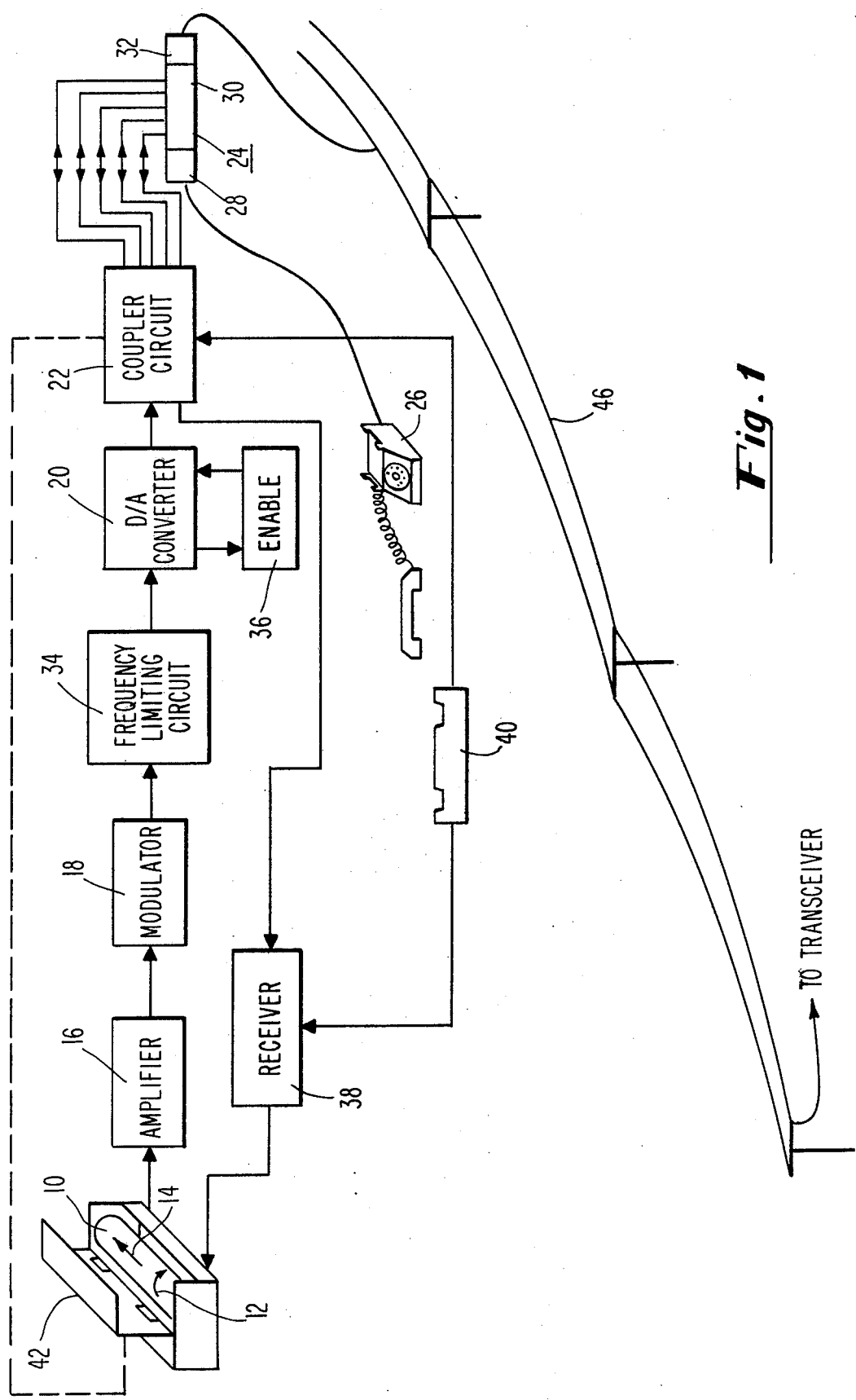
FIG. 1 is a schematic block diagram of a preferred embodiment of the invention.

Referring to the system shown in FIG. 1, a facsimile transceiver comprises a drum 10 rotated by a motor not shown in the direction depicted by an arrow 12 so as to create a relative scanning movement between a document or copy medium carried by the drum 10 and a scanning head not shown. As the scanning head is advanced axially along the drum 10 as indicated by an arrow 14 and the drum rotates about its axis as indicated by the arrow 12, successive paths on the document or copy medium are placed in communication with suitable transducers carried by the head.

When the transceiver is operating in a transmit mode, the reading transducer such as a photodetector carried by the head detects variations in light intensity due to the reflectivity of the document as the document is scanned by the photodetector. The output from the photodetector is appropriately amplified at amplifier circuitry 16.

The output from the transmitter circuitry 16 is applied to FM modulator circuitry 18. In accordance with the invention of copending application Ser. No. 844,298 filed 10/21/71, which is incorporated herein by reference, the modulated frequency of the pulse train from the circuitry is substantially higher than the frequency of the facsimile signals to be transmitted over the telephone network with a change in frequency due to a dark/light variation (or light/dark variation). Therefore, the corresponding change in frequency of the modulated transmission signal could occur in substantially less than the period of one cycle of the frequency modulated transmission signal.

In order to generate the frequency modulated transmission signal of substantially lesser frequency than the output signal of the FM modulator 18 synthesizing circuitry comprising a digital-to-analog converter 20 is utilized. The converter 20 synthesizes the FM transmission signal from the pulse train of the modulator 18 to provide a substantially sinusoidal waveform for application to a coupler circuit 22. The output of the coupler circuit 22 is connected by a suitable plug/jack arrangement 24 which provides a means of connecting a telephone set 26 to the telephone network. The telephone set 26 is connected via a plug 28 to an interposed plug/jack combination 30 which is received by the jack 32 of the telephone network.

In accordance with this invention, the output from the FM modulator circuitry 18 is coupled to the converter 20 through a frequency limiting circuit 34. The frequency limiting circuit 34 acts as a frequency divider to reduce the frequency of the pulse train from the modulator 18 whenever the frequency of that pulse train exceeds a predetermined level which in turn would generate sinusoidal waveforms at the output of the converter 20 which exceed the upper frequency limitations of the telephone network. Details concerning the nature of the frequency division and the manner in which the frequency level is detected will be described subsequently with reference to FIG. 2.

As shown in FIG. 1, the facsimile transceiver also comprises an output signal enable control circuit 36 which enables or inhibits the converter 20. The purpose of the enable control circuit 36 in addition to providing a digital on-off output control, is to assure that the FM transmission signals begin and end at or near axis crossing. Otherwise transients may result which may be detrimental to the tone decoding circuitry of associated facsimile equipment.

The facsimile transceiver also includes a receiving capability. This capability is provided by a receiver circuit 38 which includes an FM demodulator. The receiver circuit 38 demodulates the transmitted FM signal from a coupler circuit 22 and applies this demodulated video signal to an appropriate writing means such a stylus which may also be carried by the head so as to move in the direction indicated by the arrow 14. In order to permit the use of the transceiver in the absence of a telephone jack 32, an acoustic coupler box 40 is provided. The coupler box 40 is connected to the coupler circuit 22 so as to permit the transmitted and received FM signals to be acoustically coupled to the telephone network.

The transceiver shown in FIG. 1 also includes means for selectively connecting the facsimile transceiver or a voice signal to the telephone network. In order to selectively connect the signals to the telephone network, a cover 42 associated with the drum 10 activates a switch so as to alternately connect the facsimile transmitting and receiving circuitry to the telephone network or the telephone set 26 to the telephone network. The broken line 44 which extends between the cover 42 and the coupler circuit 22 in FIG. 1 is intended to depict the mechanical linkage to the switch in the coupler circuit 22.

As shown in FIG. 1, the telephone network comprises lines 46 which connect the facsimile transceiver to another transceiver. It will, however, be understood that the lines 46 may comprise other telecommunications paths including RF or optical channels.

Figure 2:
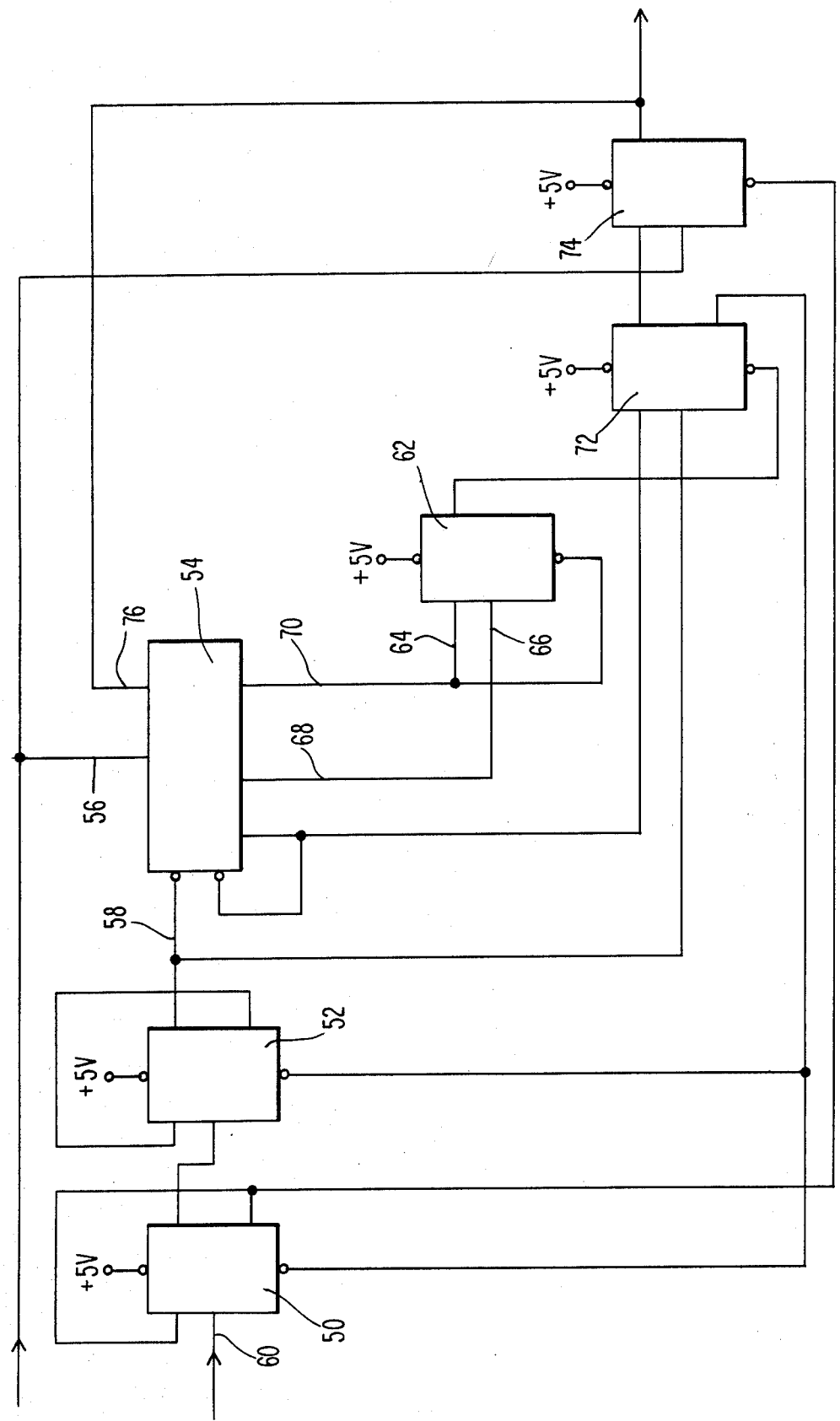
FIG. 2 is a schematic diagram of the frequency limiting circuit shown in block form in FIG. 1.

Referring now to FIG. 2, the frequency limiting circuit 34 is shown in detail as comprising frequency detecting means including a first D-type flip-flop 50, a second D-type flip-flop 52 and a counter 54. The frequency is detected by applying the pulse train from the modulator 18 to a reset terminal 56 of the counter and counting the number of clock pulses which are applied to an input terminal 58 of the counter 54 between pulses in the input FM modulated pulse train. The frequency of the clock pulses applied to a clock terminal 60 of the flip-flop 50 are divided by four such that the frequency of the clock pulses applied to the input 58 of the counter 54 is one-fourth of the frequency of the pulses applied to the clock input 60. The detecting means of the frequency limiting circuit further comprises decoding D-type flip-flops 62 and 72 having data and clock inputs connected to appropriate outputs of the counter 54. When the counter 54 reaches a predetermined count corresponding to a predetermined frequency, the flip-flop 62 will change state to remove the clear on flip-flop 72 which will change state after a predetermined number of clock pulses are applied to the input 60 of flip-flop 50 thus enabling the flip-flop 74 such that the next FM modulated input pulse will serve as a strobe to shift the data present at the D input of flop 74 to its Q output. Thus the lead or trigger edge of the output pulse is in coincidence with the lead edge of the input FM modulated pulse. The output pulse is removed by the clear action of the Q bar output of the flop 50. The counter 54 and the flops 62 and 72 are reset at the lead edge of the FM modulated output pulse provided the FM modulated input pulse remains at a logic one state for a period equal to the propogation delay of flop 74 plus the required resetting time of counter 54. The flops 50 and 52 are reset when the said predetermined number of clock pulses has been applied to the input 60 of flop 50.

The gate means of the frequency limiting circuit which passes the pulse train from the modulator 18 also comprises a D-type flip-flop 74 having its clock input connected to the output of the modulator 18. The data input from the gate 74 is connected to the Q output of the flip-flop 72 so that the gate 74 is enabled to pass a positive going pulse whenever a predetermined count has been reached in the counter 54 as decoded by the flip-flop 62 so as to set the flip-flop 72. In the event that a predetermined count has not been reached in the counter 54 in the time lapse between pulses from the modulator 18, the counter 54 will continue to count until the predetermined count has been reached. It will be understood that the counter 54 requires a reset input at the terminal 56 as well as another reset input at a terminal 76 connected to the Q output of the flip-flop gate 74 to reset the counter 54.

When the Q output of the flip-flop 72 goes high so as to enable the gate 74, the $\bar{Q}$ output resets flip-flops 50 and 52 in preparation for the next clock pulse at the input 60. The next clock pulse at the input 60 then resets the flip-flop 74 in preparation for counting out the next cycle in the pulse train from the modulator 18.

In the preferred embodiment of the invention, the pulses from the modulator 18 occur at a frequency 18 times greater than the transmission signal frequency from the converter 20. Since facsimile signals generally range from 1500 Hz. representing white to 2400 Hz. representing black, it is important that the frequency limiting circuit 34 limit the frequency of the input to the converter so as to achieve a frequency no greater than, for example, 2525 Hz. Where the output frequency of the modulator 18 is 18 times greater than the transmission signal, the 2525 Hz. transmission signal frequency will correspond with a time interval of 22 microseconds between pulses from the modulator 18. Where the transmission signal rises above 2525 Hz., the frequency limiting circuit 34 will inhibit every alternate pulse in the pulse train such that the interval between arriving pulses at the output from the frequency limiting circuit 34 is at least 22 microseconds or greater. When the output from the modulator 18 rises in frequency so that division by two is insufficient to reduce the frequency to 2525 Hz. or less, i.e., the transmission frequency would tend to exceed 5050 Hz. and the output from the modulator is 90.9 KHz., the frequency limiting circuit now divides the input frequency by four. Similarly, when the output from the modulator 18 exceeds 181.8 KHz., the frequency from the modulator 18 is divided by eight.

It will, of course, be understod that frequency division only occurs for input frequencies exceeding a predetermined upper band limit. For this reason, the frequency limiting circuit 34 is inactive for transmission frequencies below 2470 Hz. The difference between 2470 Hz. and 2525 Hz., the cutoff frequency, without activating the frequency limiting circuit 34 corresponds to 990 cycles in the pulse train from the modulator 18 which is equal to one clock pulse at the 2 MHz. clock rate. The shortest interval of time reference available to the frequency limiting circuit 34 is that of the system 2 MHz. crystal clock. Therefore, the timing window of the frequency limiting circuit 34 must be in increments of 0.5 microseconds which relates to the difference between 2470 Hz. and 2525 Hz. Normal operating output signals should not therefore exceed 2470 Hz. so as to avoid any distortion by the limiting action of the frequency limiting circuit 34.

As disclosed herein, the output frequency is halved whenever the upper limit of 2525 Hz. is reached. However, it may be desirable to provide a continuous desired output frequency which is equal to the desired upper limit of 2525 Hz. as long as the input FM modulated frequency exceeds 2525 Hz. or it would be possible to inhibit the output signal during the period when the input exceeds 2525 Hz.

Although a particular embodiment of the invention has been shown and described, it will be understood that other modifications will occur to those of ordinary skill in the art which fall within the true spirit and scope of the invention as set forth in the appended claims.

What is claimed is:

1. A facsimile transmitting apparatus for transmitting signals representing dark and light regions on a document, said apparatus comprising sensor means for sensing dark and light regions on the document and transmitting means for generating frequency modulated transmission signals representing the dark and light regions on the document, said transmitting means including signal generating means for generating a signal having a frequency substantially higher than the modulated transmission signal and converter means for converting the transmission signal from the higher frequency signal such that a light/dark or dark/light variation between the regions produces a change in frequency of the higher frequency signal which in turn produces a change in frequency of the transmission signal in a fraction of the transmission signal cycle, the improvement comprising frequency limiting means coupled between the signal generating means and the converter means for limiting the frequency of the transmission signal by limiting the frequency of the input to the converter means.

2. The facsimile transmitting apparatus of claim 1 wherein the frequency limiting circuit includes frequency detecting means for detecting the frequency of the higher frequency signal and coupling means for coupling the higher frequency signal to the converter means only when the higher frequency signal is below a predetermined frequency.

3. The facsimile apparatus of claim 1 wherein the frequency limiting means comprises:
   detecting means for detecting the frequency of a signal; and
   means for reducing the frequency of the signal when the frequency of the signal exceeds a predetermined detected level.

4. The facsimile transmitting apparatus of claim 1 wherein the frequency limiting circuit comprises frequency dividing means for dividing the frequency of the higher frequency signal.

5. The facsimile transmitting apparatus of claim 4 wherein the frequency dividing means continuously divides until the frequency of the frequency limited signal falls below a predetermined threshold.

6. The facsimile transmitting apparatus of claim 1 wherein the higher frequency signal comprises a series of pulses and a frequency limiting means comprises:
   counter means;
   clock means coupled to the counter means for applying clock pulses to the counter means during each cycle of the higher frequency signal; and
   gate means coupled to the counter means and the signal generating means for coupling the higher frequency signal to the converter means only when a predetermined count has been reached since the last higher frequency signal was coupled to the converter means.

7. The facsimile transmitting apparatus of claim 6 wherein the frequency limiting circuit further comprises means for resetting the counter after each cycle of the higher frequency signal except when the predetermined count has not been reached.

8. Protective circuitry for use with a bandwidth limited system comprising:
   detecting means for detecting when the frequency of a signal exceeds a predetermined level; and
   frequency dividing means coupled to said detecting means for dividing the frequency of said signal in response to the detection of said predetermined level.

9. The protective circuit of claim 8 wherein
   said detecting means comprises counter means and clock means coupled to said counter means for applying clock pulses to the counter means during each cycle of the signal; and
   said frequency dividing means comprises gate means coupled to said counter means for selectively blocking passage of selective cycles of said signal when the count of said clock pulses fails to reach a predetermined level.

10. The protective circuit of claim 8 further comprising means for resetting the counter after each cycle of the singal except when the predetermined count has not been reached.

* * * * *